Aug. 7, 1951     H. E. MENSER     2,563,351
RECEPTACLE HOLDER
Filed Oct. 20, 1947
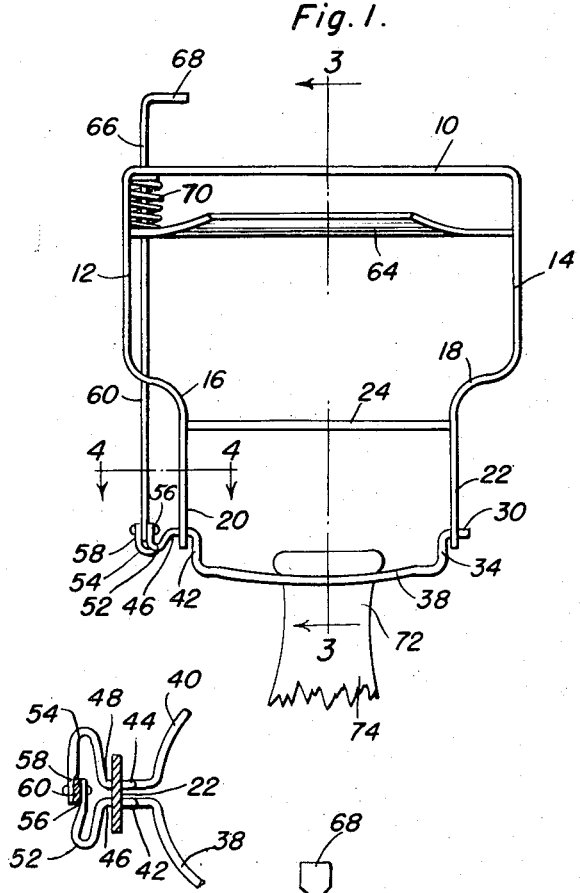
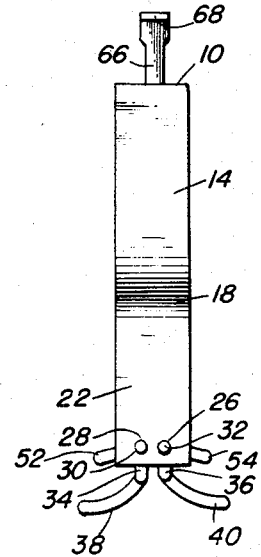
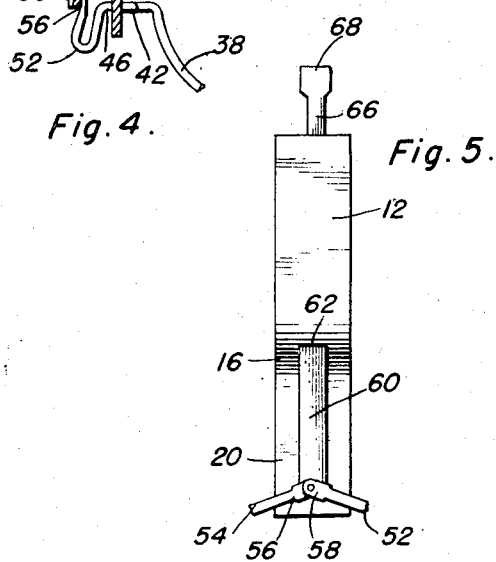
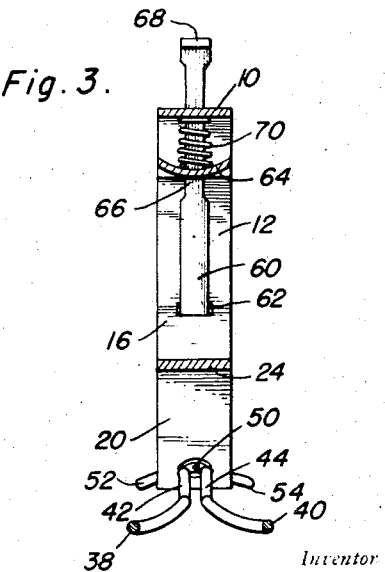
Inventor
Henry E. Menser
By *Clarence A. O'Brien and Harvey B. Jacobson*
Attorneys Patented Aug. 7, 1951

2,563,351

UNITED STATES PATENT OFFICE 2,563,351

RECEPTACLE HOLDER

Henry E. Menser, Crofton, Ky.

Application October 20, 1947, Serial No. 780,809

3 Claims. (Cl. 294—31)

This invention relates to new and useful improvements in receptacle holders and the primary object of the present invention is to provide a device for supporting milk bottles and the like in a convenient position for carrying.

Another important object of the present invention is to provide a device applicable for removing hot jars, cans or the like in a safe manner from a container of boiling fluid.

A further object of the present invention is to provide a receptacle holder including novel and improved gripping means that are adapted to frictionally engage opposite sides of a jar, can, bottle or the like.

A still further aim of the present invention is to provide a receptacle holder that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary elevational view of a milk bottle showing the present holder applied thereon;

Figure 2 is an end view of the present holder;

Figure 3 is a longitudinal vertical sectional view taken substantially on the plane of section line 3—3 of Figure 1, and showing the bottle removed therefrom.

Figure 4 is a transverse horizontal sectional view taken substantially on the plane of section line 4—4 of Figure 1; and, Figure 5 is an end view of the present invention taken in the opposite direction from Figure 2.

Referring now to the drawings in detail, wherein for the purpose of illustration, there is disclosed a preferred embodiment of the present invention, the numeral 10 represents a substantially U-shaped frame having a pair of spaced parallel legs 12 and 14 that are turned inwardly intermediate their ends to provide arcuate portions 16 and 18 that terminate in spaced parallel extensions 20 and 22.

Adjacent the portions 16 and 18 there is fixedly secured the ends of a lower cross brace 24 that retains the extensions 20 and 22 spaced parallel to each other.

Pivotally mounted in spaced apertures 26 and 28 provided in the free end of extension 22 are the outturned horizontal extremities 30 and 32 of the vertical end portions 34 and 36 of a pair of arcuate cooperative gripping members 38 and 40. The opposite end portions 42 and 44 of these gripping members are also turned vertically upward and then outwardly to provide horizontal extensions 46 and 48 that loosely engage an arcuate slot 50 provided in the free end of extension 20. The horizontal extensions 46 and 48 terminate in horizontal loops 52 and 54 having ends 56 and 58 that are pivotally mounted on opposite sides of a lever 60 that is slideably mounted in a slot 62 provided in arcuate portion 16.

Rigidly secured to the opposing faces of the legs 12 and 14 are the terminals of an arcuate upper cross member 64 that is provided with a suitable guide aperture that slidably engages the reduced intermediate portion 66 of the lever 60. The lever is also slidably mounted in the frame 10 and its outer end 68 is turned outwardly to provide a finger receiving portion and stop.

A coil spring 70 loosely embraces the reduced portion 66 of the lever and has one end suitably fixed to the reduced portion 66. The opposite end of the spring 70 bears upon the upper cross member 64 to retain the lever in a normally raised position and the gripping members 38 and 40 in a clamped position about the neck 72 of a bottle or the like 74.

The horizontal extensions 46 and 48 rotate in the slot 50 and the loops 52 and 54 are pivoted together at lever 60. When a downward force is exerted on lever 60, such force will separate loops 52 and 54, due to the toggle action of lever 60, loops 52 and 54, and the extensions 46 and 48 will rotate, permitting rotation of the gripping members 38 and 40 away from each other. A release of the downward force will permit the spring 70 to urge the members 38 and 40 toward each other, whereby the members 38 and 40 will grip the bottle 74 therebetween.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein Having described the invention, what is claimed as new is:

1. A receptacle holder comprising a substantially U-shaped member having a pair of spaced leg portions, said leg portions being turned inwardly intermediate their ends to provide arcuate portions, said arcuate portions terminating in spaced extensions, an outer cross member bracing said extensions, a pair of clamping jaws pivotally supported on said extensions, a further cross member bracing the leg portions of said U-shaped member and having a slot therein, a further slot in the web of said U-shaped member in alignment with the first-named slot, a still further slot provided in one of said arcuate portions, an operating member slidably received in all of said slots and including upper and lower portions, means operatively connecting the lower portion of said operating member to said clamping jaws for actuating the latter, and spring means yieldingly urging said jaws to a normally clamped position.

2. The combination of claim 1 wherein said spring means includes a coil spring embracing said operating member and disposed between said further cross member and the web of said U-shaped member, said coil spring having one end bearing against said further cross member and its remaining end fixed to said operating member.

3. The combination of claim 1 wherein said jaws include a pair of arcuate members having angulated end portions pivoted on said extensions, and a substantially horizontal loop at one end of each of said arcuate members.

HENRY E. MENSER.

REFERENCES CITED

The following references are of record in the file of this patent:

UNITED STATES PATENTS

| Number | Name | Date |
|---|---|---|
| 993,905 | Stuart | May 30, 1911 |
| 1,252,778 | Chorzempa | Jan. 8, 1918 |
| 2,204,843 | Campbell | June 18, 1940 |